United States Patent [19]
Aschenbrenner et al.

[11] Patent Number: 6,145,403
[45] Date of Patent: Nov. 14, 2000

[54] ROBOT ARM WITH WEIGHT COMPENSATION

[75] Inventors: Alexei Aschenbrenner; Norbert Sedlmair, both of Augsburg; Norbert Settele, Petersdorf-Wilprechtszell, all of Germany

[73] Assignee: KUKA Roboter GmbH, Augsburg, Germany

[21] Appl. No.: 09/184,028

[22] Filed: Nov. 2, 1998

[30] Foreign Application Priority Data

Nov. 5, 1997 [DE] Germany .......................... 197 48 822

[51] Int. Cl.[7] .................................................. B25J 17/00
[52] U.S. Cl. .......................... 74/490.01; 361/144; 901/48
[58] Field of Search .......................... 74/490.01; 901/48; 361/139, 142, 144

[56] References Cited

U.S. PATENT DOCUMENTS

| | | | |
|---|---|---|---|
| 3,076,125 | 1/1963 | Kumpf | 361/144 |
| 4,598,601 | 7/1986 | Molaug | 901/48 |
| 4,753,128 | 6/1988 | Bartlett et al. | 901/48 |
| 4,803,895 | 2/1989 | Nishizawa et al. | 74/490.01 |
| 5,220,849 | 6/1993 | Lande et al. | 901/48 |
| 5,402,690 | 4/1995 | Sekiguchi et al. | 74/490.01 |
| 5,415,057 | 5/1995 | Nihei et al. | 74/490.01 |
| 5,467,244 | 11/1995 | Jayawant et al. | 361/144 |
| 5,667,186 | 9/1997 | Luber et al. | 901/48 |
| 5,767,648 | 6/1998 | Guillaume . | |
| 5,813,712 | 9/1998 | Mozelt | 361/144 |

FOREIGN PATENT DOCUMENTS

| | | |
|---|---|---|
| 1-164580 | 9/1989 | Japan . |
| 8-090484 | 8/1996 | Japan . |
| 10-044071 | 4/1998 | Japan . |

*Primary Examiner*—David Fenstermacher
*Attorney, Agent, or Firm*—Paul Vincent

[57] ABSTRACT

A driven robot arm (1) has a torque compensation unit for a motional degree of freedom (4). A separate magnetic compensation unit (9) is proposed which is independent of the robot arm drive.

17 Claims, 3 Drawing Sheets

ROBOT ARM WITH WEIGHT COMPENSATION

BACKGROUND OF THE INVENTION

The present invention concerns a robot arm with associated torque compensation for at least one motional degree of freedom.

Robots having pivotable arms are used in the automobile industry for welding the chassis. The bearing of this type of arm is normally unstable and measures must taken to prevent the arm from tilting over downwardly about the pivot axis. Various methods are used in order to prevent this.

Brakes can be provided to prevent tipping. For example, a brake disposed on a driven linkage having a rotational degree of freedom is disclosed in EP-0093889 A1. This conventional configuration has a gear ring disposed on a braking solenoid which can engage a gear ring disposed on a rotor of an electrical motor drive to prevent rotation of the linkage.

For maintenance and when moving the robot out of its neutral equilibrium position, a stable neutral position must be guaranteed when the brake is released without the danger of tilting over. This requires additional structures for torque compensation.

Prior art has used counter weights which directly or indirectly act on the pivot axis via a linkage. Except for the required checks of the linkage, this configuration is essentially maintenance-free. However, the inertia of the arm is thereby increased, which makes the drive more difficult and expensive to construct.

Conventional mechanical spring elements are relatively maintenance-free. However, they require a large amount of space and do not facilitate pivot-dependent or otherwise adjustable compensation.

Hydraulic or pneumatic cylinder-piston configurations for torque compensation are also known in the art. One end of the cylinder-piston configuration is eccentrically linked to a component rotating along with the pivot axis, whereas the oppositely lying end is linked to a fixed base member of the robot arm. The application of pressure to the piston exercises force from the base onto the eccentric to prevent a tipping over of the arm. These types of cylinder-piston configurations can produce an amount of force which is necessary to prevent tilting and are also compact. Regulation of the pressure in the cylinder permits these forces to be adjusted. Cylinder-piston configurations are however relatively maintenance intensive and therefore rather expensive to use. In addition, pneumatic cylinders require a separate air connection and hydraulic cylinders have problems with regard to leakage.

Alternatively, the drive motor moving the robot arm about the pivot axis can provide the required opposing torque. However, this is only practical for small forces, since a substantial increase in effort with regard to the motor, the linkage, and the associated servo amplifiers is otherwise required.

It is therefore the purpose of the invention to avoid the above mentioned disadvantages while guaranteeing an improved torque compensation, in particular, of simpler construction and reduced maintenance.

SUMMARY OF THE INVENTION

In accordance with the invention, a robot arm has a magnetic compensation unit, separate from the drive.

Compensation requires balancing-out a force exercised on the robot arm (i.e. a gravitational force) by opposing this force in both a moving and stationary state, especially during controlled operation. The compensation usually acts in one direction. One must therefore differentiate between braking, (the activation of a brake to prevent motion) and compensation.

The fundamental principle of the invention is to use a magnetic (in particular a magnetostatic) force element to compensate for the forces and torques, the element being separate from the drive of the robot arm and effecting a compensation which is substantially proportional to a displacement of the arm away from a neutral position. In contrast to torque compensation with electrical motors using rotating magnetic fields, the separate, drive-independent magnetic tilting compensation is of simple construction and avoids complicated drive mechanisms. The compensation of the tilting moment does not have to be exact, and the tilting moments caused by the weight of the arm can be over-compensated or preferentially, slightly under-compensated, when pivoting into a working position.

The magnetic compensation unit advantageously comprises a magnetic configuration having a gap through which magnetic fields penetrate and an armature moveable therein. For a given magnetic strength, particularly high field forces can act on the armature in a gap. The gap can be formed between pole pieces. This poses simple requirements on the shape of the magnets. The armature is advantageously made from a material having good magnetic conductivity, for example, a soft magnetic material with particularly high permeability. In such a configuration, the armature attempts to move onto a position in which the magnetic flux is maximized, i.e. the armature attempts to take up as large a portion of the space filled by the field as possible. The magnetic configuration itself can comprise a plurality of individual magnet modules. An appropriate configuration of the individual magnetic strengths and of the spatial extent of the modules can create or approximate a predetermined field distribution corresponding to a desired behavior of the compensation in dependence on the rotational position of the robot arm.

A magnetic configuration having only permanent magnets has the advantage that even if power is lost, it nevertheless remains active and requires no energy. Possible magnetic materials preferentially include rare earth magnets or ferrites.

Electromagnets can also be used in place of or in addition to permanent magnets. Electromagnets have the advantage of creating changing force dependences so that compensation can be changed, in particular, as a function of the angular position of the robot arm. The winding density of electromagnets can be varied to effect a corresponding spatial variation of the magnetic field produced by the magnet. In this manner, desired characteristic compensation dependence can be achieved or at least approximated. The electromagnets can also have a plurality of mutually independent windings which are each excited by a different current. This preferred configuration permits a predetermined torque characteristic to be achieved with equivalent constructional configuration of the individual winding sections. In this case, a plurality of constant current leads, e.g. one per winding, can be provided. Alternatively thereto or complementary therewith, the electromagnets can have an excitation current control which provides the excitation current in dependence on at least one of the axis position, the operation load and the dimension of the arm. Using these quantities, a processing computer or the like can easily calculate that excitation current required for the desired torque characteristics, in each case. Use of a current control which can calculate the output current in dependence on the quantities mentioned also permits a simple change in the tilt moment compensation characteristics should the robot arm be retrofitted.

If both permanent magnets and electromagnets are used, the permanent magnets guarantee a power-independent torque compensation for a secure neutral position and the electromagnets can be used to effect the desired compensation characteristics when the robot arm is pivoted.

In a preferred embodiment of a robot arm in accordance with the invention, the separation between the armature and the wall of the gap is small compared to the width of the gap and at least one of the armature and wall of the gap are configured in a friction reducing manner. A small gap width maximizes the force between the armature and the magnetic configuration and thereby the compensation torque which can be achieved. Despite the very narrow configuration, wear caused by friction between the armature and the gap as well as additional loading of the robot arm drive can be avoided if at least one of the armature and the wall of the gap facing the armature are configured in a friction reducing fashion. A low-friction coating on the armature or on the wall of the gap, ball bearings or roller bearings can be provided to reduce friction.

The invention also concerns a control for a robot arm having electromagnetic compensation for the torque exercised by the weight of the arm about the pivot axis, the control being adapted to provide an electromagnetic excitation current in dependence on at least one of the arm position, the operation load and the arm dimensions. The control can be part of a closed current regulation loop for adjusting the desired force to effect a desired torque compensation. The invention also concerns a method for compensation of the torque on a robot arm, wherein the torque compensation is magnetic and separate from the drive.

The compensation unit in accordance with the invention is also within the purview of the invention.

The invention is described below in an exemplary manner with reference to the drawing.

DESCRIPTION OF THE PREFERRED EMBODIMENT

Figure 1:
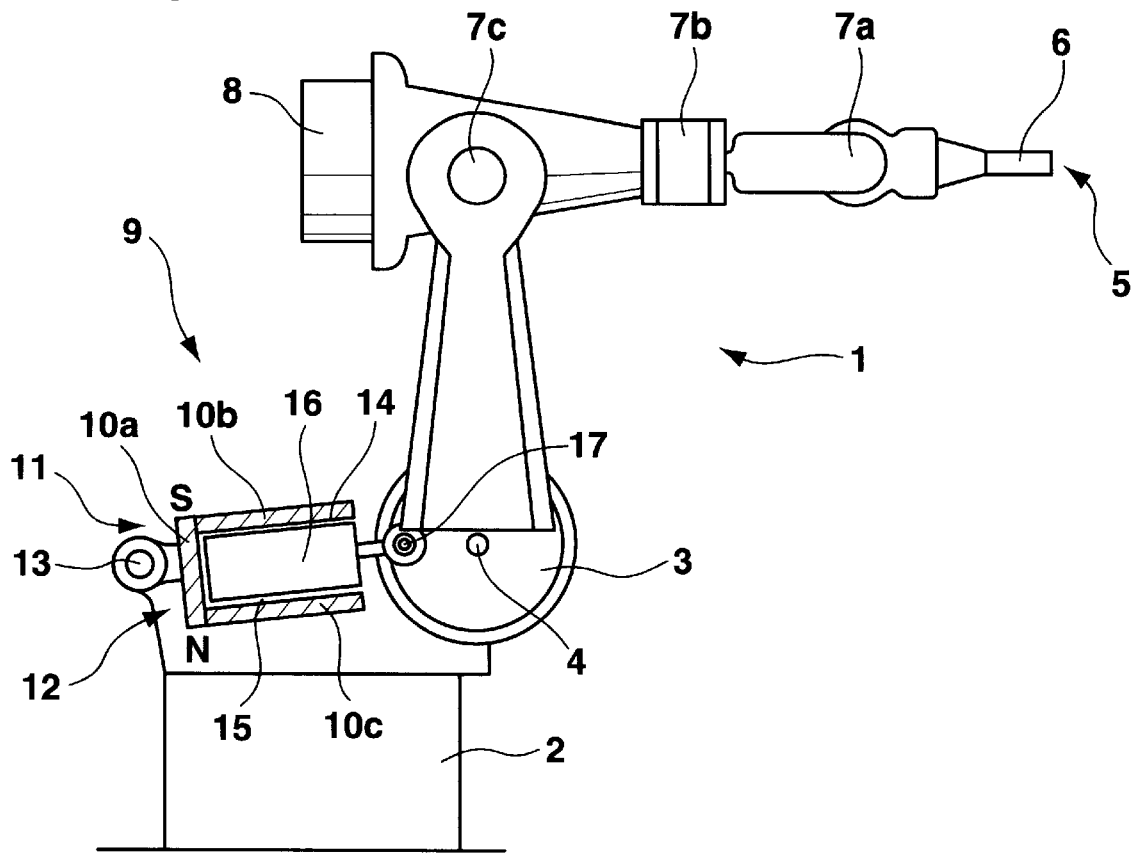
FIG. 1 shows a robot arm having a magnetic compensation unit in accordance with the invention, partially in section.

FIG. 1 shows a robot arm 1 extending from a base 2 to which it is attached for pivoting about a horizontal shaft 4 together with a wheel 3. A tool 6 is disposed on the distal end 5 of the robot arm 1 and can be moved via linkages 7a, 7b, 7c with differing degrees of freedom via a motor and having associated counterweights 8.

A magnetic torque compensation unit 9 is disposed on the projecting arm 1 to prevent tilting of the arm 1 about the shaft 4 into a horizontal position. The tip-over and torque compensation unit 9 includes a magnet configuration 10 having a terminal 12 at an end 11 facing away from the arm 1. The terminal 12 is linked to the base 2 by means of a link pin 13 and supports a strong permanent magnet 10a made from ferrite or a magnet alloy having rare earth elements.

Figure 2:
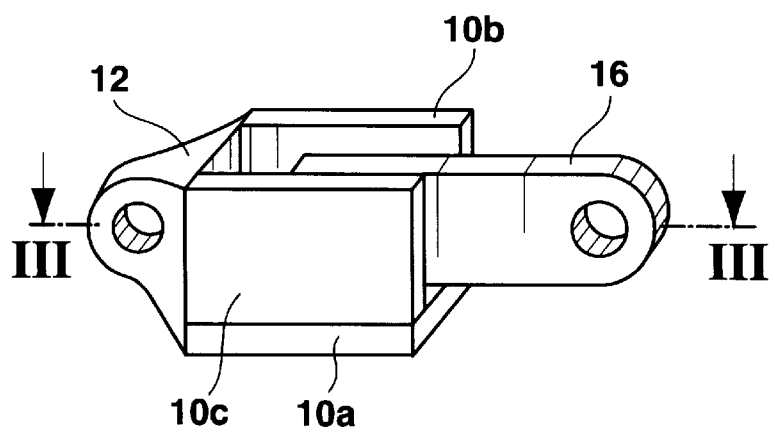
FIG. 2 shows a perspective view of a compensation unit in accordance with the invention.
Figure 3:
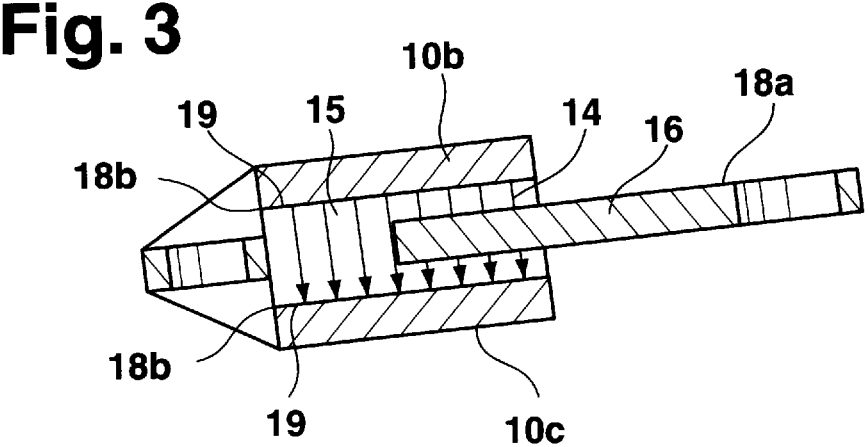
FIG. 3 shows a section of a compensation unit in accordance with the invention.
Figure 4A:
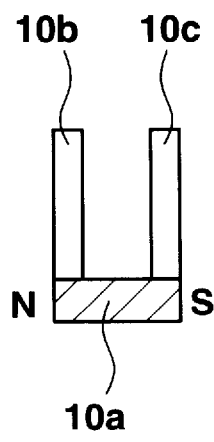
FIG. 4a shows a first embodiment of a planar magnet configuration having permanent magnets.
Figure 4B:
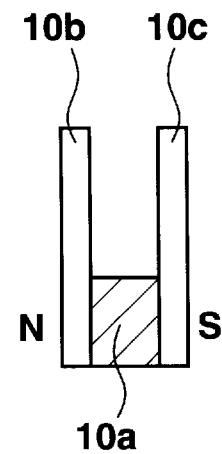
FIG. 4b shows a second embodiment of a planar magnet configuration having permanent magnets.

Pole pieces 10b and 10c seat on each pole of the permanent magnet 10a. FIG. 2 and the section of FIG. 3 defined by the line III—III of FIG. 2, show that the pole pieces 10b and 10c associated with the magnet configuration 10 have inner facing sides which are substantially parallel to each other and are substantially flat while defining a gap 14. The gap 14 is penetrated by magnetic fields 15 whose field lines are indicated by arrows in FIG. 3. The pole pieces 10b, 10c can, as shown in FIGS. 2, 3 and 4a, seat on the magnet 10a or can be sidewardly disposed thereto (see FIG. 4b).

The magnet configuration 10 further comprises an armature 16 which can move between the pole pieces 10b and 10c, which is flat, and which is a good magnetic conductor (e.g. made from a soft magnetic material and having high magnetic permeability). The armature 16 is hinged at a link pin 17 at its end facing away from the magnet configuration 10. The link pin 17 is attached to a wheel 3, eccentrically with respect to the axis and shaft 4. The wheel 3 can move together with the shaft 4 and the arm 1.

The soft magnetic armature 16 can enter into the gap 14 and be pulled at least partially out of same. The separation between the gap 14 and the anchor 16 is exaggerated in the drawing for reasons of clarity. In practice, the width of the gap 14 is approximately that of the armature 16. A lubricating coating 18a is introduced onto the armature 16 and lubricating coatings 18b are also provided for on the walls of the gap 19 facing the armature 16, in order to reduce friction during penetration of the armature 16 into the gap 14.

Friction reducing measures other than lubricating coatings 18a, 18b can be provided for, such as ball bearings or roller bearings and can be alternatively disposed on the armature 16 or on the walls of the gap facing same.

The device functions as follows. During operation, the arm 1, having the tool 6, is moved out of the neutral position shown towards a piece to be worked under rotation of the shaft 4 (in the clockwise direction of FIG. 1). The pivoting of the arm 1 in the forward direction causes it to leave its equilibrium position such that it tends to tip about the shaft 4 in a downward direction.

The rotation of the wheel associated with pivoting of the arm causes an associated rotation of the link pin 17 attached to the wheel 3 (in FIG. 1, in a clockwise direction) in an upward direction to thereby rotate the tilt moment compensator 9, as a unit, about the link pin 13 disposed on the base 2. Since this increases the separation between the two link pins 13 and 17, the armature 16, eccentrically linked to the wheel 3, is partially pulled out of the gap 14.

The armature 16 is urged to move towards a position at which it can occupy the magnetic field filled region between the pole pieces 10b and 10c to thereby close the magnetic circuit and maximize the magnetic flux between the pole pieces 10a and 10b. A force therefore acts on the armature 16 along the line between the two link pins 17 and 13 which pulls the armature 16 into the gap 14. This force is transferred to the wheel 3 via the link pin 17 to exercise a torque (in FIG. 1 in a counterclockwise direction) opposing the tilting of the arm. The tilt moment compensation unit 9 of the present invention is thereby based on the magnetic reluctance principle. The arm located in the magnetic field tends to assume a position maximizing magnetic flux by occupying as large a portion of the field-filled space as possible (if appropriate in regions of higher field density) and thereby minimize the magnetic resistance of the magnetic circuit.

The above configuration permits a complete and precise compensation of the tilting moment. Exact compensation of the tilting moment is not absolutely necessary and a certain degree of over or under-compensation is possible. In particular, it is possible for only a portion of the tilt moment to be compensated magnetostatically as described and additional complementary means can be provided to prevent further tilting.

Instead of the planar magnetic configuration 10 shown, other geometries are conceivable. A magnetic arm configuration in the form of a hollow cylinder 20, shown in FIG. 6*a*, can also be used. Corresponding components are thereby provided with the same reference symbols as in the previous drawings. In this case, the magnet configuration 10 has a hollow cylindrical shape and the anchor 16, has low magnetic resistance and is preferentially made from soft magnetic material. The anchor 16 has a size closely matched to that of the gap in the hollow cylinder cavity 14 and is inserted therein. The magnetization of the hollow cylinder 20 is thereby chosen in such a fashion that one magnetic pole (arbitrarily chosen in the figure as the south pole) is disposed at the open end of hollow cylinder 20 and the opposite magnetic pole is disposed at the opposite end of the hollow cylinder 20 facing away from the armature.

Figure 6A:
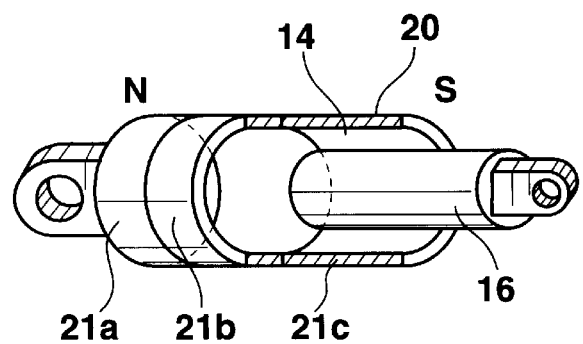
FIG. 6a shows cylindrical magnet configurations, partially in section.

The configuration shown in FIG. 6*a* is characterized by a modular hollow cylinder 20 (illustrated by modular separation lines). This modular magnet configuration comprises a plurality of modules 21*a*, 21*b*, 21*c* of differing lengths and having differing degrees of magnetic strength which are conjoined into one unit.

During operation of this embodiment, the restoring force exercised on the armature 16 changes with displacement away from the neutral position in a manner determined by the choice of modules. In this manner, a desired dependence of the resorting force exercised on the arm 1 (i.e. a desired force-path dependence) can be achieved or at least approximated in a simple fashion. Clearly, the magnet configuration can also comprise identical modules 21 only, for example, in torque compensation units for differing robot arms having differing maximum strokes.

Figure 5A:
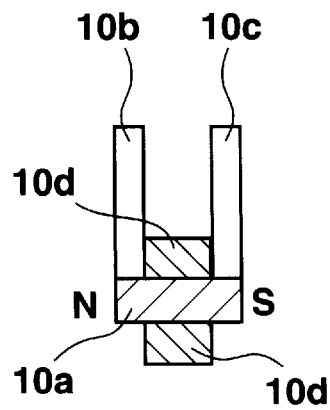
FIG. 5a shows a first embodiment analogous to FIG. 4a with additional electromagnets.
Figure 5B:
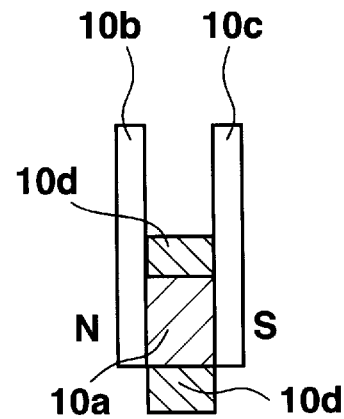
FIG. 5b shows a second embodiment analogous to FIG. 4b with additional electromagnets.
Figure 6B:
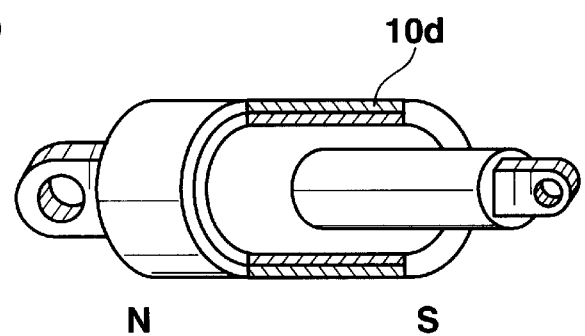
FIG. 6b shows a cylindrical magnet configuration with electromagnets, partially in section.

A further embodiment of the invention is shown in FIGS. 5*a*, 5*b* and 6*b*. Corresponding components are designated with the same reference symbols. The embodiments in accordance with FIGS. 5*a* and 5*b* differ from those of FIGS. 4*a* and 4*b* in that an electrically excitable magnet coil 10*d* is disposed around the permanent magnets 10*a*. In the embodiment of FIG. 6*b*, a magnetic coil 10*d* of this kind surrounds the permanent magnet hollow cylinder 19.

The magnet coil 10*d* can be easily supplied with a constant current to amplify the effect of the permanent magnetic field, in particular, when pulling back the robot arm into the neutral position. The field can also be weakened to load-relieve the drive motor during the working cycle so that it must not operate in opposition to the restoring force.

Figure 7:
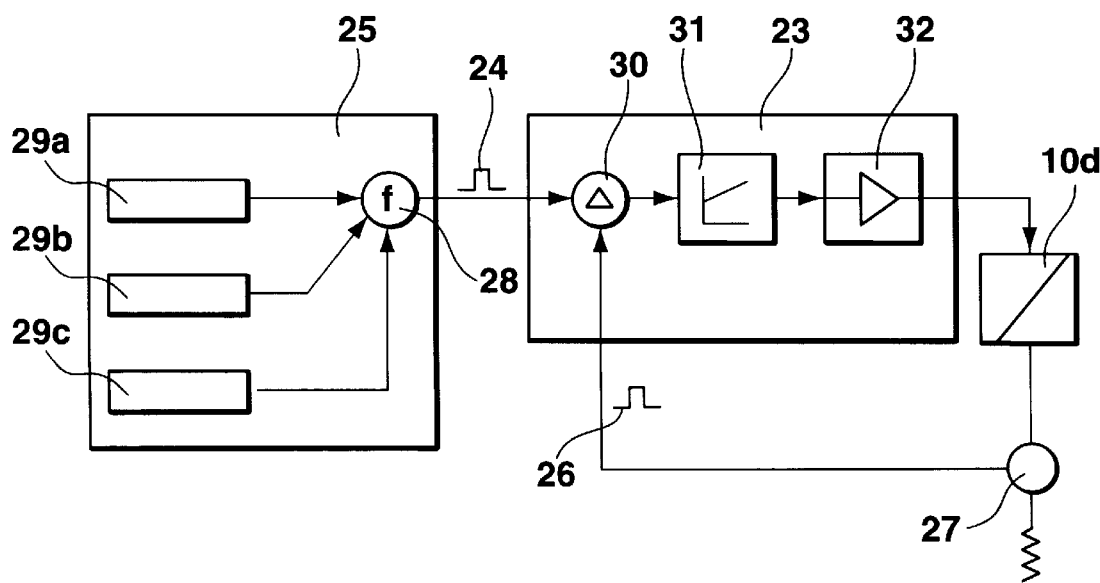
FIG. 7 shows a schematic view of a current control for the embodiment of FIGS. 5a, 5b and 6b.

In accordance with an additional embodiment, a current control scheme is provided as shown in FIG. 7. In accordance with FIG. 7, an excitation current is fed to the electromagnet 10*d* from a current regulation stage 23 which receives an input signal 24 (corresponding to a desired current signal) from a desired current calculation stage 25 and preferentially, an actual current signal 26 from a current sensor 27 associated with the coil.

A concatenation stage 28 of the desired current calculation stage 25 determines the current, taking into consideration the output of a constant current determination stage 29*a*, a load component determination stage 29*b*, and a position registration stage 29*c* to achieve a desired force-path dependence. The load component determination can, in particular, take into consideration the dimensions of the robot arm, the tool 6 disposed on the arm and, if appropriate, an associated tool load, dependent on the actual working phase. The concatenation stage 28 and the units 29*a*, 29*b* and 29*c* can be part of a numerical robot arm control.

The current regulation stage has a difference stage 30 which generates a difference between the desired current determination output from the stage 25 and the actual value recorded by the sensor 27. This is output to a current regulator 31 which prepares the input signal to the power output stage 32. The power output stage 32 supplies the coil 10*d* with excitation current.

In this circuit, the excitation current can change during a working cycle so that the associated strengths of the magnetic fields produced by the coils also change. However, these time variations are slow compared to the motion of the robot arm so that the magnetic configuration in accordance with the invention functions quasi-statically and magnetostatic effects result in application of the reluctance principle.

The magnetic coils 10*d* are made from electrically continuous construction elements. However, a plurality of individual coils can also be used. In this case, differing constant or varying currents can easily be supplied to each individual coil. Especially for hollow cylinders, only one respective portion of the coil can be exited at the position to which the armature should be pulled. In addition, a spatial variation of the strength of the magnetic field along the hollow cylinder can also be effected though variation of the winding density per unit length.

Instead of the above described embodiment having a linear armature moving in and out of an air gap, a configuration having a pivoting armature is also possible. This is particularly advantageous when the degree of freedom on which the torque compensation unit acts is not a pivoting degree of freedom, rather a rotational degree of freedom to allow at least one complete rotation about the axis.

The torque compensation unit can comprise one single unit or a plurality of units. In particular, two units can be configured symmetrically on each side of the arm.

The compensation unit in accordance with the invention can be adapted for connection to conventional configurations.

Special force dependencies are possible through appropriate dimensioning or configuration of the armature. Bore holes or openings can be provided or the armature can be constructed from materials having different (but preferentially always high) magnetic permeabilities.

The compensation unit must not be disposed between the base and the arm, and can also be used between two arm portions of which the proximal member is linked via one or more linkages to the base.

We claim:

1. A robot arm system having a robot arm and a drive, the system comprising:

a stationary housing;

a magnet configuration mounted to said housing separate from the drive, said magnet configuration having an inner surface defining a cavity having a clearance width, said magnet configuration generating a magnetic field penetrating through said cavity;

an armature disposed for displacement within said cavity, said armature made from a non-magnetized magnetic conducting material of high permeability, wherein said magnetic field permeates said armature to pull said armature into said cavity; and means for connecting said armature to the robot arm to provide torque compensation for at least one motional degree of freedom of the robot arm.

2. The system of claim 1, further comprising friction reducing means cooperating with at least one of said armature and said inner surface.

3. The system of claim 2, wherein said friction reducing means comprises a lubricating coating.

4. The system of claim 1, wherein said armature has a separation from said inner surface which is substantially less than said cavity clearance width.

5. The system of claim 4, wherein said separation is one of less than $\frac{1}{5}$ of said clearance width and less than $\frac{1}{10}$ of said clearance width.

6. The system of claim 1, wherein said magnet configuration comprises at least one permanent magnet.

7. The system of claim 6, wherein said permanent magnet consists of one of a rare earth magnet and a ferrite magnet.

8. The system of claim 1, wherein said magnet configuration comprises an electromagnet.

9. The system of claim 8, wherein said electromagnet comprises a varying winding density.

10. The system of claim 8, wherein said electromagnet comprises a plurality of independent windings.

11. The system of claim 8, further comprising an excitation current control to provide a constant current feed to said electromagnet.

12. The system of claim 8, further comprising an excitation current control for feeding current to said electromagnet in dependence on at least one of an axis position, an operation load and a size of the robot arm.

13. The system of claim 8, further comprising a control means cooperating with said electromagnet, said control means having means for providing at least one electromagnetic excitation current for electromagnetic compensation in dependence on at least one of an arm position, an operation load and an arm size.

14. The system of claim 13, wherein said excitation current means comprises a closed current regulation loop.

15. The system of claim 1, wherein said magnet configuration comprises a plurality of individual magnet modules.

16. A torque compensation unit for a robot, the robot having a robot arm and a drive, the unit comprising:

a stationary housing;

a magnet configuration mounted to said housing separate from the drive, said magnet configuration having an inner surface defining a cavity having a clearance width, said magnet configuration generating a magnetic field penetrating through said cavity;

an armature disposed for displacement within said cavity, said armature made from a non-magnetized magnetic conducting material of high permeability, wherein said magnetic field permeates said armature to pull said armature into said cavity; and means for connecting said armature to the robot arm to provide torque compensation for at least one motional degree of freedom of the robot arm.

17. A method for torque compensation of a robot arm, the robot arm having a drive, the method comprising the steps of:

a) mounting a magnet configuration to a stationary housing separate from the drive, said magnet configuration having an inner surface defining a cavity having a clearance width, said magnet configuration generating a magnetic field penetrating through said cavity;

b) disposing an armature for displacement within said cavity, said armature made from a non-magnetized magnetic conducting material of high permeability, wherein said magnetic field permeates said armature to pull said armature into said cavity; and c) connecting said armature to the robot arm to provide torque compensation for at least one motional degree of freedom of the arm.

* * * * *